United States Patent [19]
Fluhr et al.

[11] 3,942,127
[45] Mar. 2, 1976

[54] ASPHERIC CASSEGRAIN LASER POWER AMPLIFIER SYSTEM

[75] Inventors: Frederick R. Fluhr, Oxon Hill; Stephen T. Hanley, Temple Hill; R. Bernard Brown, Upper Marlboro, all of Md.

[73] Assignee: The United States of America as represented by the Secretary of the Navy, Washington, D.C.

[22] Filed: Apr. 11, 1975

[21] Appl. No.: 567,339

[52] U.S. Cl. .............................. 330/4.3; 331/94.5 C
[51] Int. Cl.² .......................................... H01S 3/08
[58] Field of Search ................. 331/94.5 C, 94.5 D; 330/4.3

[56] References Cited
UNITED STATES PATENTS

| | | | |
|---|---|---|---|
| 3,307,113 | 2/1967 | Hughes | 330/4.3 |
| 3,585,523 | 6/1971 | Glenn et al. | 331/94.5 C |
| 3,824,487 | 7/1974 | Buczrk et al. | 331/94.5 C |
| 3,873,942 | 8/1973 | Reilly | 331/94.5 C |

OTHER PUBLICATIONS

Frieberg et al., "New Data an Unstable Resonators," 5/73, pp. 59–63, Laser Focus.

*Primary Examiner*—T. H. Tubbesing
*Assistant Examiner*—N. Moskowitz
*Attorney, Agent, or Firm*—R. S. Sciascia; Arthur L. Branning; Melvin L. Crane

[57] ABSTRACT

An optical power amplifier system for extracting high power radiation from a basic active laser media. The system includes a plurality of basically confocal mirrors so positioned that radiation output from a laser is amplified, that no power is absorbed in the supporting structure and it has no feedback from the secondary mirror. In the system, the laser beam passes through the active laser media region at least four times which increases the output power.

8 Claims, 5 Drawing Figures

ASPHERIC CASSEGRAIN LASER POWER AMPLIFIER SYSTEM

BACKGROUND OF THE INVENTION

This invention relates to laser power amplifier systems and more particularly to an amplifier system for extracting high radiant power from a basic active laser media such as gas dynamic lasers, E-beams, chemical, etc.

Heretofore radiation has been amplified by reflecting the radiation back and forth through a laser cavity. Laser power amplifiers have used, straight multiple pass configurations through the active gain media. These may be for three, four, or more passes. In such systems, the radiation reflected toward the optical path would feed a portion of the beam back through the system.

Other systems for amplifying laser power have been set forth in the prior art. One such system is set forth in U.S. Pat. No. 3,706,939 which includes a description of a laser power amplifier with a carbon dioxide gas laser.

SUMMARY OF THE INVENTION

This invention is directed to a power amplifier system which extracts high power optical radiation from a laser media. Ths system includes a gas dynamic, E-beam, or chemical laser from which power is extracted. The extracted power is as near diffraction limited as can be attained from the active media at the highest power possible while maintaining the beam quality of the laser radiation. A mirror reflection system reflects a laser beam through a laser media four or more times by use of appropriate mirrors. Each time the laser beam traverses the laser media, the output power is amplified until the finally reflected beam is directed to a target. Between the first and second pass along the length of the laser media the beam is flipped over by the mirrors to produce the same effect on the laser beam especially when a gas flow type laser is used.

DETAILED DESCRIPTION

Figure 1:
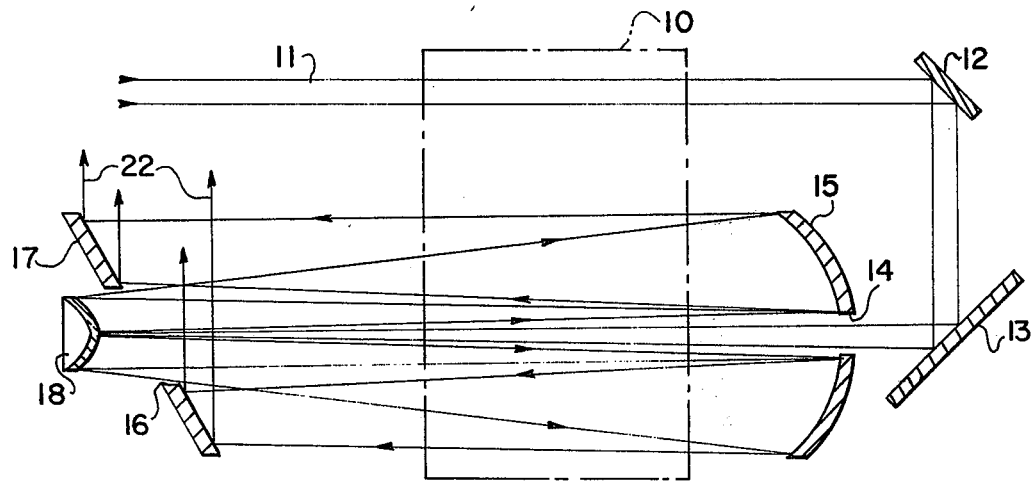
FIG. 1 illustrates a laser power amplifier made in accordance with the teaching of this invention.

Now referring to FIG. 1 of the drawing there is illustrated a power amplifier system made in accordance with the teaching of this invention. As shown, FIG. 1 illustrates a basic active laser media 10 such as a gas dynamic laser, E-beam laser, or chemical laser from which a high radiant power is extracted by use of a mirror system in close proximity thereto. The high radiant power is extracted by use of a laser beam 11 which passes through the active laser media perpendicular to the axis thereof and is incident on a plane reflective mirror 12 set approximately at a 45° angle with respect to the incident laser beam. The radiation is reflected in a direction nearly normal to the path of the incident beam and nearly parallel with the linear axis of the active laser media. The radiation is incident on a second plane mirror 13 which reflects the radiation back through the active laser media "down stream" of the laser beam on its first passage through the active laser media. The radiation reflected from plane mirror 13 is reflected through a central passage or aperture 14 within an asperic concave primary mirror 15, through the active laser media nearly normal to the axis thereof and through an axial aperture 16 within plane mirror 17 onto an aspheric convex secondary reflective mirror 18 which is secured within the passage 16 of mirror 17 coaxial therewith. The radiation incident on mirror 18 is reflected back through the active laser media at an angle with the axis thereof onto the concave mirror 15 outwardly of the aperture 16 therein which reflects the radiation back through the active laser media onto the plane mirror 17 outwardly of aperture 16 therein. Since the radiation is reflected by the convex mirror 18 to the concave mirror 15, the radiation is spread outwardly in a conical path outside of the aperture 14 in the concave primary mirror 15. Since the mirror is concave and the radiation is incident at an angle relative thereto the radiation reflected by the concave mirror is reflected back through the active laser media normal to the linear axis between mirrors 13 and 18. The radiation passes through the active laser media, it is incident on plane mirror 17 and is reflected therefrom as a collimated output beam.

Thus, it is seen that the laser radiation passes through the active laser media several times to extract high radiant power from the active laser media thereby amplifying the power of the original radiation beam.

Figure 2:
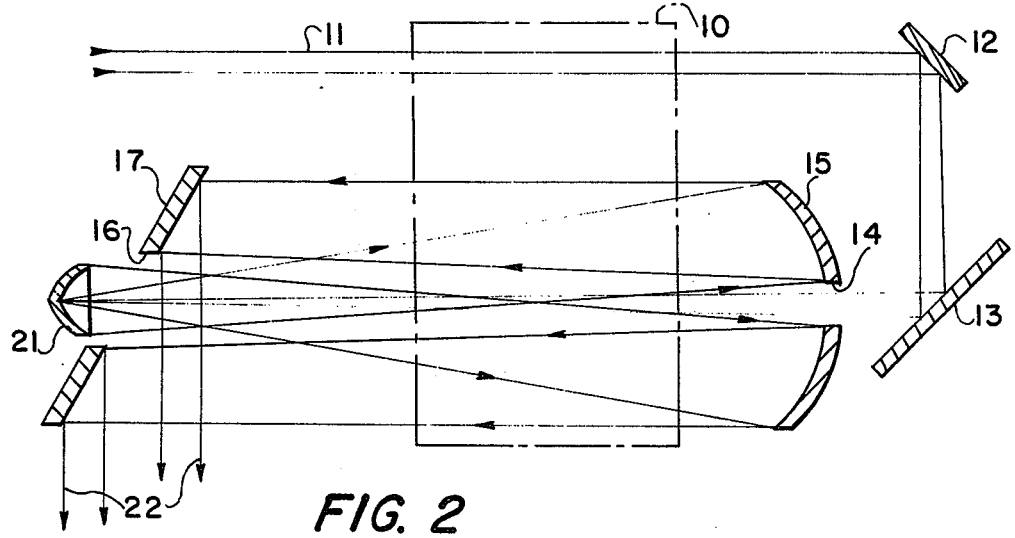
FIG. 2 illustrates a modification of the system in FIG. 1.

FIG. 2 illustrates the use of an aspheric concave secondary mirror 21. The arrangement of the mirror reflectors is the same as that shown in FIG. 1 except for the concave mirror 21. Mirror 17 is shown sloped in a different direction; however the direction of mirror 17 is not relevant.

The laser radiation passes through the active laser media the same as set forth for FIG. 1. The difference being in the direction of reflection of the amplified radiation from the concave mirror surface 21, which is as shown.

Figure 3:
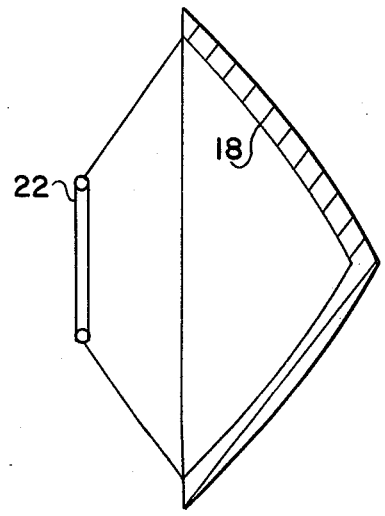
FIGS. 3, 4 and 5 illustrates enlarged views of mirrors shown in FIGS. 1 and 2.
Figure 4:
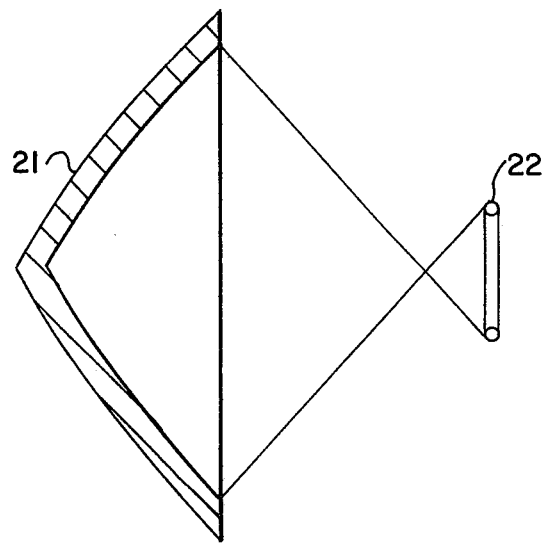
Figure 5:
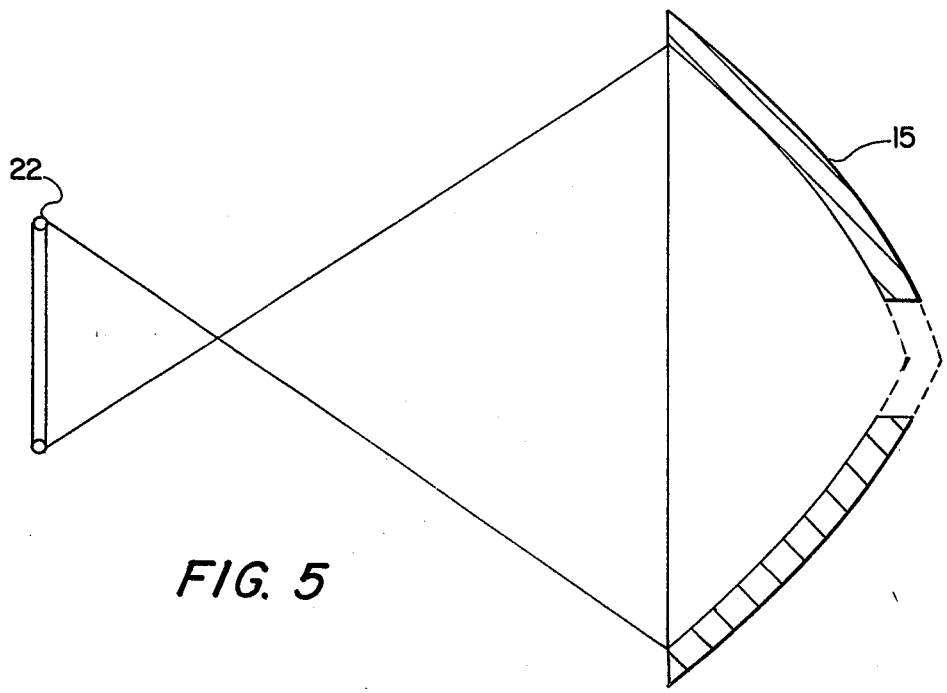

FIGS. 3, 4 and 5 are respectively enlarged views of the aspheric convex secondary mirror 18, the aspheric concave mirror 21, and the aspheric concave primary mirror 15. The mirror designs are such that each has a circular focal ring 22 as indicated by FIGS. 3, 4 and 5. The mirrors are symmetrical figures of rotation using a spherical radius of curvature for long cavity lengths which is off axis and when properly aligned any second order aberations will be symmetrical about the main axis. As a power amplifier, the system will usually have a large focal length aperture diameter and the cross-section curve will be spherical.

In operation, a collimated input laser beam 11 passes through the active laser media 10 and is directed by mirrors 12 and 13 to the input of the aspheric Cassegrainian power amplifier. The aspheric convex secondary mirror has a ring focus as shown in FIG. 3 therefore the incident radiation from mirror 13 reflected by mirror 18 is spread to fill the aspheric concave primary mirror, which also has a ring focus as shown in FIG. 4. The spread beam from mirror 18 incident on mirror 15 is reflected in collimated lines to flat mirror 17 which also reflects the amplified output radiation 22 in collimated lines. The radiation is collimated due to the fact that the focal ring of mirrors 18 and 15 are coincident (confocal).

It is noted that the beam passes through the gain active laser media four times. The beam is flipped over by the mirrors 12 and 13, this is important in lasers such as a gas dynamic type where the gain region is a flowing gas transverse to the laser beam being amplified. In operation, the beam diameter is large enough that the upstream side of the beam will have a larger gain than the downstream side, thus by flipping the beam the overall cross-section gain of the laser beam is more uniform. The output beam is controlled by position of the secondary mirror 18 with respect to primary mirror 15. The output beam will be collimated when the two focal point rings of the convex and concave mirrors are coincident. The same applies to the arrangement of the mirror surfaces set forth in FIGS. 1 and 2.

The system described herein functions to extract high energy from the active laser media. The reflection of the laser beam from one surface to the other functions to prevent any unwanted feedback of radiation through the system. Further the system avoids unwanted power absorption in the support structure.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. A laser power amplifier system so positioned relative to an active laser media to redirect laser radiation through said active laser media, which comprises:
   a first mirror juxtaposed said active mirror laser media which receives a laser beam subsequent to passing through said active laser media substantially perpendicular to the axis thereof and reflects said laser beam therefrom;
   a second mirror for receiving said laser beam reflected from said first mirror and reflecting said laser beam back through said active laser media substantially perpendicular to the axis thereof;
   an aspheric concave primary mirror positioned between said second mirror and said active laser media;
   said primary mirror having an axial aperture therein through which said laser beam is reflected from said second mirror;
   an aspheric secondary mirror positioned to receive said laser beam reflected from said second mirror subsequent to passing respectively through said primary mirror and said active laser media;
   a plane mirror with an axial aperture therein positioned juxtaposed said secondary mirror with said secondary mirror secured opposite said aperture in said plane mirror coaxially therewith;
   whereby said secondary mirror receives said laser beam reflected from said second mirror and reflects said laser beam back through said active laser media onto said primary mirror which reflects said laser beam back through said active laser media onto said plane mirror which reflects said laser beam as a collimated output beam.

2. A laser power amplifier system as claimed in claim 1; wherein
   said aspheric secondary mirror is convex.

3. A laser power amplifier system as claimed in claim 1; wherein
   said aspheric secondary mirror is concave.

4. A laser power amplifier system as claimed in claim 1; wherein
   said secondary and said primary mirrors are made with focal length rings which are coincident.

5. A laser power amplifier system as claimed in claim 1; wherein
   said mirrors are positioned with their centers on a plane through the linear axis of the active laser media.

6. A laser power amplifier system as claimed in claim 5; wherein
   said active laser media is a suitable gas.

7. A laser power amplifier system as claimed in claim 6; wherein
   said active laser media is a flowing gas; and
   said second mirror is positioned down stream of said first mirror.

8. A laser power amplifier system as claimed in claim 5; wherein
   said active laser media is a suitable high power solid state material.

* * * * *